United States Patent
Vanleeuwen et al.

(10) Patent No.: US 11,470,178 B2
(45) Date of Patent: Oct. 11, 2022

(54) SYSTEM AND METHOD FOR ROBUST LOCAL CACHE HANDLING

(71) Applicant: Shinydocs, Waterloo (CA)

(72) Inventors: Peter Vanleeuwen, Waterloo (CA); Robert Haskett, Waterloo (CA); Jason Cassidy, Waterloo (CA); Ben Barth, Waterloo (CA); Khalid Merhi, Waterloo (CA)

(73) Assignee: Shinydocs, Waterloo (CA)

( * ) Notice: Subject to any disclaimer, the term of this patent is extended or adjusted under 35 U.S.C. 154(b) by 0 days.

(21) Appl. No.: 17/128,262

(22) Filed: Dec. 21, 2020

(65) Prior Publication Data

US 2021/0194980 A1    Jun. 24, 2021

Related U.S. Application Data

(60) Provisional application No. 62/950,650, filed on Dec. 19, 2019.

(51) Int. Cl.
*H04L 67/1097* (2022.01)
*H04L 67/568* (2022.01)
*H04L 67/06* (2022.01)

(52) U.S. Cl.
CPC ............ *H04L 67/568* (2022.05); *H04L 67/06* (2013.01); *H04L 67/1097* (2013.01)

(58) Field of Classification Search
CPC ...... G06F 16/16; G06F 16/168; G06F 16/172; G06F 16/176; G06F 16/182; G06F 16/1824; H04L 67/06; H04L 67/1095; H04L 67/1097; H04L 69/40; H04L 67/568
See application file for complete search history.

(56) References Cited

U.S. PATENT DOCUMENTS

| | | | |
|---|---|---|---|
| 8,806,056 B1* | 8/2014 | Majee | H04L 67/06 709/237 |
| 9,792,179 B1* | 10/2017 | Lazier | G06F 11/1076 |
| 2002/0161890 A1* | 10/2002 | Chen | H04L 67/1095 709/226 |
| 2012/0011408 A1* | 1/2012 | Swamy | G06F 11/0745 714/57 |
| 2013/0212432 A1* | 8/2013 | Guthrie | H04L 67/06 714/16 |
| 2014/0201145 A1* | 7/2014 | Dorman | G06F 16/178 707/634 |
| 2014/0229578 A1* | 8/2014 | Chu | H04L 67/1097 709/219 |
| 2014/0289367 A1* | 9/2014 | Kinebuchi | H04L 67/06 709/219 |
| 2014/0365430 A1* | 12/2014 | Funayama | G06F 16/16 707/609 |

(Continued)

FOREIGN PATENT DOCUMENTS

CN    108737484 A * 11/2018 ......... H04L 67/1097

*Primary Examiner* — Vivek Srivastava
*Assistant Examiner* — William C McBeth

(57) ABSTRACT

A local cache content management is configured to improve the speed and reliability of access of the content management system across poor or intermittent connections. Additional techniques are used to allow document use and storage when the content management system is unavailable, and to maintain synchronization between the local cache and the content management system.

20 Claims, 2 Drawing Sheets

(56) References Cited

U.S. PATENT DOCUMENTS

| | | | |
|---|---|---|---|
| 2015/0156281 A1* | 6/2015 | Krieger | H04L 67/06 |
| | | | 709/203 |
| 2015/0278330 A1* | 10/2015 | Hawa | H04L 67/1095 |
| | | | 709/203 |
| 2017/0063607 A1* | 3/2017 | Maruyama | H04L 67/1097 |
| 2017/0161296 A1* | 6/2017 | Ritter | G06F 16/178 |
| 2019/0005031 A1* | 1/2019 | Kataria | H04L 67/1097 |
| 2019/0253478 A1* | 8/2019 | Andaz | H04L 67/1097 |

* cited by examiner

SYSTEM AND METHOD FOR ROBUST LOCAL CACHE HANDLING

CROSS REFERENCE TO RELATED APPLICATIONS

The application claims priority to and the benefit of U.S. Provisional Patent Application Ser. No. 62/950,650, entitled "SYSTEM AND METHOD FOR ROBUST LOCAL CACHE HANDLING", filed on Dec. 19, 2019, the disclosure of which is incorporated herein by reference in its entirety.

FIELD OF INVENTION

Embodiments described herein relate to the generally relate to the field of computer systems and more specifically to remote file storage and access.

BACKGROUND

Content management systems are often used to store files and other data for access by users of an organization's computers. Some kinds of content management systems provide customized interfaces, such as web-based interfaces. Web browsers are used to interact with stored files. One problem with this approach is that users are not necessarily familiar with such interfaces and can be resistant to learning such. This can cause the content management system to become underutilized, as it is often the case that users prefer the file interface native to the computer operating system with which they are familiar.

Other types of content management systems provide interfaces that appear and behave like a native file interface. However, these systems often suffer from other drawbacks. In some cases, the file interface mimics the native interface, but is not similar enough for users to accept. Some of such systems are based on synchronizing local copies of a file with a remote copy stored at the content management system. Systems relying on synchronization can have poor performance and may not support functionality available at the content management system and the native file interface.

A content management system enables a central server to connect to remote nodes at client sites. Content management systems may periodically synchronize the data between the client and server to ensure the data is up to date. In certain instances, the client/server connection may not be reliable. Further, if there is a large amount of data to synchronize, the synchronization process may increase latency which may provide a bad user experience. Caching is a mechanism where files and data are stored locally for quick retrieval of the data to increase performance. An effective mechanism to provide local caching is desirable.

SUMMARY

A local cache content management is configured to improve the speed and reliability of access of the content management system across poor or intermittent connections. Additional techniques are used to allow document use and storage when the content management system is unavailable, and to maintain synchronization between the local cache and the content management system.

DETAILED DESCRIPTION

This disclosure concerns exposing a remote content management system to a local user's computer as a local or shared drive. Rather than simply mimicking the look and feel of a local/shared drive, the operating system (OS) and user are presented with a local/shared drive that is controlled by an interface at or below the level of the file system driver. The remote content management system thus appears substantially identical to a local/shared drive, which places little to no learning curve on users. The system intelligently handles temporary files and file permissions. The system also allows for smooth migration from legacy storage to content management system. A significant savings in cost and complexity is often realized by implementing this relatively light process for redirecting remote file system requests WINDOWS® client), in comparison to implementing a content server access node at the remote site. Other features and advantages of the system will be apparent from the following description.

Further embodiments of the content management system are described in US patent application US20160050257, entitled "Interfacing with remote content management systems" which is herein incorporated by reference.

Figure 1:
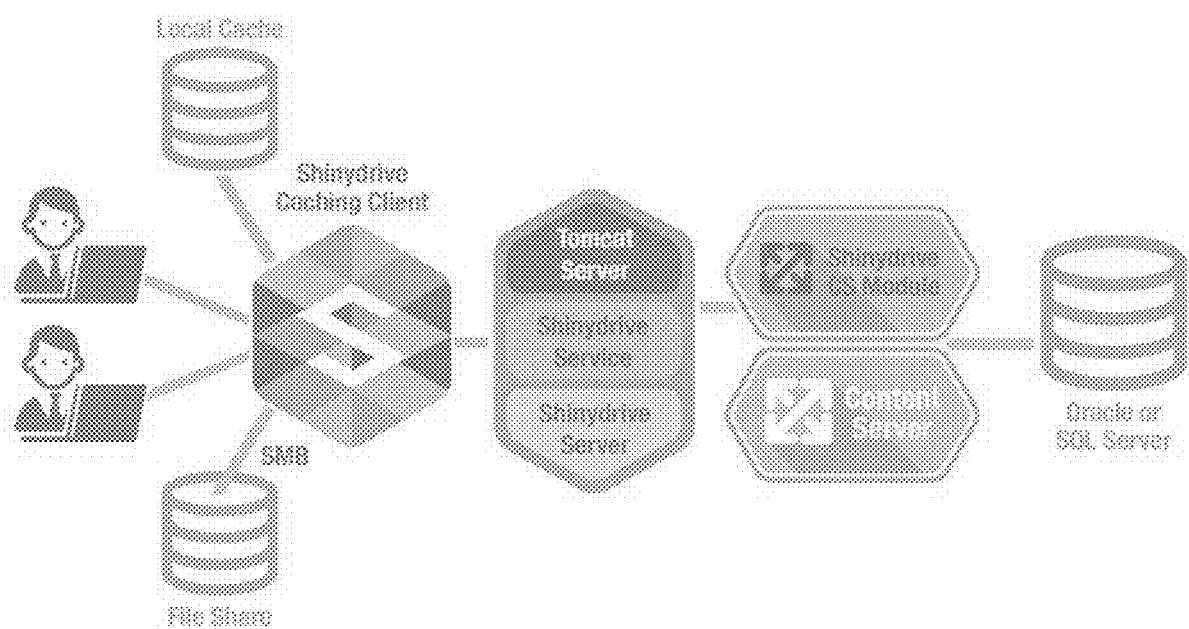
FIG. 1 is a schematic diagram illustrating a content management system.

FIG. 1 is a schematic diagram illustrating a content management system. An example of an ECM (Enterprise Content Management system) includes OPENTEXT® content server. The content server connects to a database which may be an ORACLE® database or Microsoft SQL Server a MICROSOFT® SQL® server. Content management system may also be generically referred to as an enterprise content management (ECM) system.

An ECM connection module (e.g. CS Module) connects to an ECM server (e.g. Content Server) to enable communication and synchronization of data. The CS Module connects to connectivity components which includes a web server such as TOMCAT® network presentation translation service (such as a SHINYDRIVE™ service) and a network presentation translation server (such as a SHINYDRIVE™ server).

The connectivity module connects to client components through a WINDOWS® client (such as a SHINYDRIVE™ WINDOWS® client) which has caching mechanisms. The SHINYDRIVE™ WINDOWS® client locally couples with the remote enterprise content management (ECM) drives. The SHINYDRIVE™ WINDOWS® client does not care where those ECMs came from or what it is; the information is opaque to the client. The caching client also enables multiple users to connect via their computer or laptop.

Figure 2:
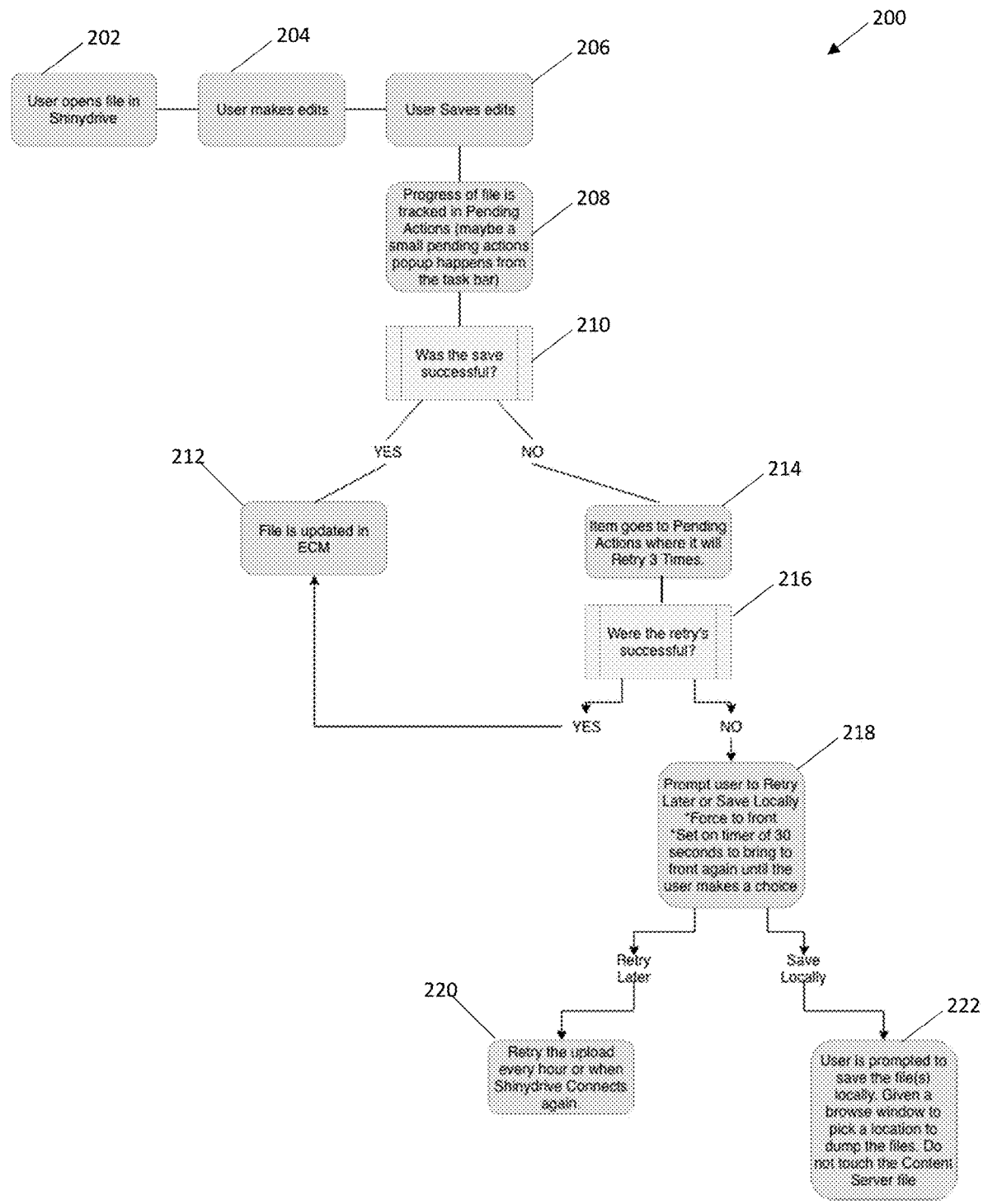
FIG. 2 is a workflow diagram illustrating an exemplary caching method.

FIG. 2 is a workflow diagram illustrating an exemplary caching method. According to the workflow 200 of FIG. 2, the user opens a file in the Shinydrive application on their local computer, at step 202. The user will then make edits to the file, at step 204, and then saves the file locally, at step 206. The next step is to save the file onto the Enterprise Content Management (ECM) system at the server, at step 208.

Tracking the successful save to the ECM is done by the Pending Action service. The SHINYDRIVE™ application will then track the progress of the save in the Pending Actions service and queue to save it to the ECM server. In some instances, a pending actions icon or indicator may pop up or be displayed in the task bar.

The next step is to determine whether saving the file to the ECM was successful, at step 210. If the save was successful, then the file is updated at the ECM server, at step 212. If the save was not successful, the item returns to the Pending Action service where it retired three times to save to ECM server, at step 214. If any of the save retries are successful, at step 216, the file is then updated into the ECM server, at step 212.

However, if the retries are not successful, the system will then prompt the user to either "Retry Later" or "Save Locally", at step 218. Certain logic such as pushing it to the front of the pending actions queue or setting a timer at 30 seconds (or at other predetermined time) until the user makes a choice can be implemented.

If the choice is to "Retry Later", the retry action is repeated every hour (or at other predetermined time) or when the Shinydrive application connects to the server again, at step 220.

If the choice is made to "Save Locally", the user is prompted to save the file locally on the local hard drive of the computer, at step 222. The user is provided a browse window to select a location to save the file. The server version of the file on the ECM (i.e. Content Server) is not touched.

According to an embodiment of this disclosure, a computer-implemented method of accessing a locally cached content management system configured to improve speed and reliability of the content management system is disclosed. The method comprise receiving a request to save or store a data file in a content management system, registering the request and the current state of the request into a pending actions queue, determining whether the file was saved successfully into the content management system, wherein if the file was not saved successfully, updating of the state of the request in the pending actions queue and initiating an alternate save procedure.

According to a further embodiment, an alternate save procedure consists of this embodiment consists of prompting of the user to select retrying or to saving locally, if the user selects the saving locally option, prompting the user for a local location on the computer to save the file, saving the file locally on the computer, and removing the request from the pending actions queue, and if the user selects the retrying option, retry saving the file to the content management system when a trigger event occurs, until a maximum number of retries has been attempted.

According to a further embodiment, an alternate save procedure further comprises saving the file on a computer networked server separate from the computer, updating the request in the pending actions queue to use the network-saved file as the source file for saving to the content management system, and retrying saving the network-saved file to the content management system when a trigger event occurs, wherein the retry saving occurs until a maximum number of retries has been attempted.

Other strategies may be employed to force saving the current state, to retry saving to the ECM and to present the user with a status or choice on how to proceed. One strategy may be to poll the availability of the ECM and present notification to the user when the ECM is available. Another strategy may be to save multiple copies locally, to protect against data loss. Another strategy may be to allocate space on another network resource and save a temporary copy to this network resource, and set a flag to indicate that the temporary copy should be sync'd to the ECM whenever possible.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

What is claimed:

1. A content management system, the content management system comprising:
   a server configured to store a plurality of files of the content management system; and
   a local device comprising a processor configured, by a set of executable instructions storable in a nontransient memory device, to:
   receive a request to save a file in the server;
   register the request and a request state in a pending actions queue;
   track progress of the save in the pending actions queue;
   display a pending actions indicator pop-up in a task bar;
   determine whether the file is successfully saved in the server;
   if the file is successfully saved in the server, update the file in the server;
   if the file is not successfully saved in the server:
      update the request state in the pending actions queue and retry saving the file in the server up to three times;
      determine whether the file is successfully saved in the server;
         if the file is successfully saved in the server, update the file in the server;
         if the file is not successfully saved in the server, initiate an alternate save procedure, the alternate save procedure comprising:
            prompting a user to select one of retrying saving the file in the server later and saving the file in the local device, the prompting comprising prompting selecting every 30 seconds until a selection is made;

if saving the file in the local device is selected, prompting the user for a local location on the local device for saving the file, saving the file in the local location on the local device, and removing the request from the pending actions queue; and if retrying saving the file in the server later is selected, retrying saving the file in the server every hour or when a trigger event occurs, until a maximum number of retries has been attempted.

2. The content management system of claim 1, wherein the trigger event comprises at least one of a lapse of a predetermined time interval and receipt of a notification indicating connection to the server.

3. The content management system of claim 1, wherein the maximum number of retries is 3.

4. The content management system of claim 1, wherein the maximum number of retries is one of user selectable and computer selectable.

5. The content management system of claim 1, wherein the alternate save procedure further comprises saving the file to multiple locations.

6. The content management system of claim 5, wherein the multiple locations are all local locations on the local device.

7. The content management system of claim 5, wherein at least one of the multiple locations is on a networked server separate from the local device.

8. The content management system of claim 1, wherein the alternate save procedure further comprises:

saving the file on a networked server separate from the local device;

updating the request in the pending actions queue to use the network-saved file as a source file for saving to the content management system; and retrying saving the network-saved file to the server when a trigger event occurs, until the maximum number of retries is reached.

9. The content management system of claim 8, wherein the trigger event comprises at least one of a lapse of a predetermined time interval and receipt of a notification indicating connection to the server.

10. The content management system of claim 8, wherein the maximum number of retries is 3.

11. A method of providing a content management system, the method comprising:

providing a server configured to store a plurality of files of the content management system;

providing a local device comprising a processor configured, by a set of executable instructions storable in a nontransient memory device, to:

receive a request to save a file in the server;

register the request and a request state in a pending actions queue;

track progress of the save in the pending actions queue;

display a pending actions indicator pop-up in a task bar;

determine whether the file is successfully saved in the server;

if the file is successfully saved in the server, update the file in the server;

if the file is not successfully saved in the server:

update the request state in the pending actions queue and retry saving the file in the server up to three times;

determine whether the file is successfully saved in the server;

if the file is successfully saved in the server, update the file in the server;

if the file is not successfully saved in the server, initiate an alternate save procedure, the alternate save procedure comprising:

prompting a user to select one of retrying saving the file in the server later and saving the file in the local device, the prompting comprising prompting selecting every 30 seconds until a selection is made;

if saving the file in the local device is selected, prompting the user for a local location on the local device for saving the file, saving the file in the local location on the local device, and removing the request from the pending actions queue; and if retrying saving the file in the server later is selected, retrying saving the file in the server every hour or when a trigger event occurs, until a maximum number of retries has been attempted.

12. The method of claim 11, wherein the trigger event comprises at least one of a lapse of a predetermined time interval and receipt of a notification indicating connection to the server.

13. The method of claim 11, wherein the maximum number of retries is 3.

14. The method of claim 11, wherein the maximum number of retries is one of user selectable and computer selectable.

15. The method of claim 11, wherein the alternate save procedure further comprises saving the file to multiple locations.

16. The method of claim 15, wherein the multiple locations are all local locations on the local device.

17. The content management system of claim 15, wherein at least one of the multiple locations is on a networked server separate from the local device.

18. The method claim 11, wherein the alternate save procedure further comprises:

saving the file on a networked server separate from the local device;

updating the request in the pending actions queue to use the network-saved file as a source file for saving to the content management system; and retrying saving the network-saved file to the server when a trigger event occurs, until the maximum number of retries is reached.

19. The method of claim 18, wherein the trigger event comprises at least one of a lapse of a predetermined time interval and receipt of a notification indicating connection to the server.

20. The method claim 18, wherein the maximum number of retries is 3.

* * * * *